A. J. CONNELL.
METALLIC CONDUIT FOR ELECTRICAL CONDUCTORS.
APPLICATION FILED JUNE 22, 1916.
1,277,550.
Patented Sept. 3, 1918.
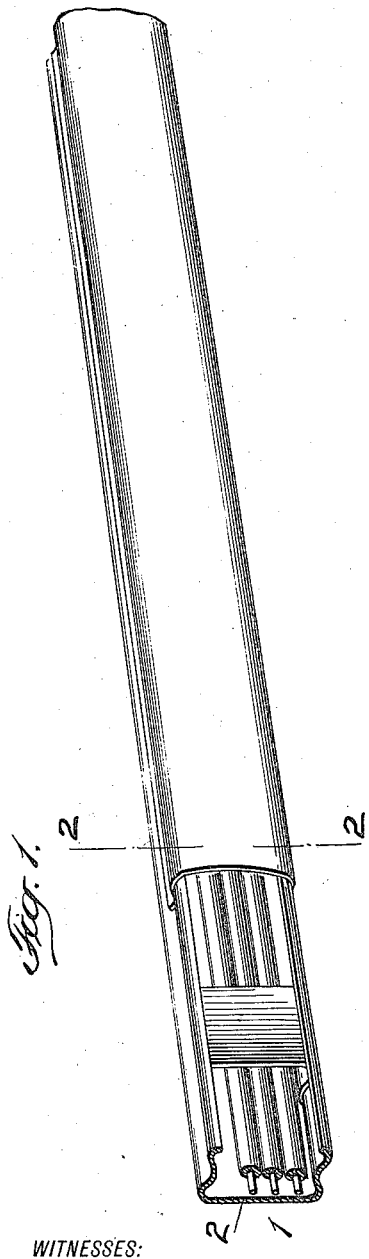
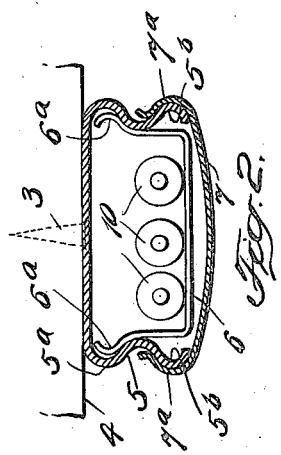
WITNESSES:
INVENTOR
Andrew J. Connell
BY Joseph F. O'Brien
His ATTORNEY

UNITED STATES PATENT OFFICE.

ANDREW J. CONNELL, OF COLLEGE POINT, NEW YORK, ASSIGNOR TO EMPIRE ART METAL CO., INC., A CORPORATION OF NEW YORK.

METALLIC CONDUIT FOR ELECTRICAL CONDUCTORS.

1,277,550.

Specification of Letters Patent.

Patented Sept. 3, 1918.

Application filed June 22, 1916. Serial No. 105,130.

*To all whom it may concern:*

Be it known that I, ANDREW J. CONNELL, a citizen of the United States, and a resident of College Point, in the county of Queens and State of New York, have invented certain new and useful Improvements in Metallic Conduits for Electrical Conductors, of which the following is a specification.

This invention relates to improvements in metallic conduits for electrical conductors.

By the use of my invention I provide, first, a metallic receiving conduit adapted to receive and partially inclose electrical conductors, a clip adapted to engage and interlock with suitable grooves formed on the inner surface of the conduit body for the purpose of supporting the electrical conductors within said body and preventing displacement thereof when, for example, the body is attached to the ceiling of a building, and the cover removed therefrom; and a cover having inwardly extending spring flanges adapted to clip over and interlock with coöperating resilient flanges on said body portion to completely inclose the conductors and to keep said conductors and conduit body free from dust.

In the accompanying drawings in which similar reference characters designate corresponding parts throughout the several views, Figure 1 is a perspective view of a conduit embodying my invention, a part of the cover being removed to show the position of electrical conductors within the same;

Fig. 2 is a section on the line 2—2 of Fig. 1.

Referring now to these drawings, 1 indicates a conduit body bent up from a single strip of sheet metal to form a substantially flat abutting or attaching portion 2, which portion is usually attached by screws 3 or the like to a ceiling 4 of a building or other structure, and sides 5 extending outwardly on opposite sides of said abutting portion and formed with compound oppositely-disposed bends to provide on the inner surface of the said sides, seats for a series of interior conductor-supporting clips 6 and also to provide resilient arc-shaped flanges along the marginal edges of said sides, over which flanges and engaging the outer surface thereof a cover 7 having similarly-shaped coöperating resilient flanges $7^a$—$7^a$ is adapted to seat. In the preferred form of my invention shown in Figs. 1 and 2 the sides 5 are bent in compound oppositely-disposed curves to provide intermediate arc-shaped portions $5^a$ and marginal arc-shaped flanges $5^b$ extending parallel thereto. In said form, the intermediate arc-shaped portions $5^a$ are adapted to permit the seating of arc-shaped marginal flanges $6^a$ of interior conductor-supporting clips 6 within the same without affecting the resilience of the arc-shaped flanges $5^b$ which are adapted to fit within and coöperate with similar resilient flanges on the cover 7 as hereinabove described.

In installing my invention, the conductors are strung adjacent to the conduit body, and a series of clips are inserted to support such conductors within said body. If clips of the construction shown in Figs. 1 and 2, having arc-shaped inwardly extending flanges $6^a$—$6^a$ at their opposite marginal edges are employed, the conductors are gathered between the flanges of the clips and they are simply forced inwardly at suitable points along said conduit body and the flanges $6^a$ will interlock with and seat within the arc-shaped intermediate portions $5^a$ of said conduit body. Obviously the electric conductors 10 will thus be supported and securely retained within said conduit body independently of the cover 7 and without in any way affecting the resilience of the marginal flanges $5^b$ over which the cover 7 will then be applied. Furthermore because of the resilience of both the marginal flanges of the cover and conduit body, the cover may be readily applied but will be firmly held in place when so applied.

Having described my invention, I claim:

In a conduit for electric conductors, the combination with a conduit body formed of a single strip of sheet metal, having a substantially flat attaching portion and side portions extending outwardly therefrom bent in the form of a compound curve to provide intermediate arc-shaped portions adjacent to said attaching portion and resilient arc-shaped flanges along the marginal edges of such side portions, a series of supporting clips each comprising a bridging portion, and elongated inwardly extending portions substantially co-extensive in length with the sides of said conduit body and having resilient arc-shaped marginal flanges adapted to seat upon the inner surfaces of the said intermediate arc-shaped portions of said side portions, and a cover having arc-shaped marginal flanges adapted to resiliently engage and interlock at the outer side of the arc-shaped marginal flanges of said side portions.

In witness whereof I have signed my name to the foregoing specification in the presence of two subscribing witnesses.

ANDREW J. CONNELL.

Witnesses:
 ANNA SCHMIDT,
 GRACE DARCY.